United States Patent Office 3,763,235
Patented Oct. 2, 1973

3,763,235
SELECTIVE HYDROLYSIS
Jack Newcombe, Freehold, N.J., Jesse R. Motes, Sulfur, La., and James E. Kmiecik, Houston, Tex., assignors to Cities Service Company, New York, N.Y.
No Drawing. Filed July 30, 1971, Ser. No. 167,806
Int. Cl. C07c 103/10, 103/19, 103/20
U.S. Cl. 260—558 A
8 Claims

ABSTRACT OF THE DISCLOSURE

An amide is prepared by the transition metal-catalyzed selective hydrolysis of the corresponding nitrile in a carboxylic acid solvent. The catalyst is a cupric, nickelous, or mercuric salt, preferably a salt in which the anion is the conjugate base of the carboxylic acid. According to a preferred embodiment of the invention, the nitrile is an aromatic nitrile, e.g., terephthalonitrile.

BACKGROUND OF THE INVENTION

Field of the invention

This invention relates to a process for preparing amides and more particularly relates to a process for preparing amides by the selective hydrolysis of the corresponding nitriles.

Description of the prior art

It is known that amides may be prepared by the hydrolysis of the corresponding nitriles. However, known processes for accomplishing the hydrolysis have various disadvantages. Among these disadvantages are the high cost, toxicity, susceptibility to poisoning by metal impurities and/or lack of selectivity of the catalysts which have been used. For example, with some catalysts the hydrolysis leading to the formation of the amide may be rapidly succeeded by the hydrolysis of the amide to the corresponding acid, so that virtually no amide is recoverable. With other catalysts the yield of amide may be so low, e.g., about 10%, as to be almost negligible.

SUMMARY OF THE INVENTION

An object of this invention is to provide a novel process for preparing an amide.

Another object is to provide a novel process for preparing an amide by the selective hydrolysis of the correponding nitrile.

A further object is to provide such a process which is relatively economical and efficient and which utilizes a catalyst that is relatively insensitive to the concentrations of impurities normally found in the reagents.

These and other objects are attained by hydrolyzing a nitrile in the presence of a carboxylic acid as a solvent and a cupric nickelous, or mercuric salt as a catalyst.

DESCRIPTION OF THE PREFERRED EMBODIMENTS

The nitrile which is hydrolyzed in the process of the invention may be any one or more aliphatic or aromatic nitriles containing one or more cyano groups and, if desired, substituents which are inert to the catalyst, such as halo, nitro, alkoxy, hydroxy, oxo, and thio groups. Exemplary of the nitriles are acetonitrile, chloracetonitrile, butyronitrile, 5-ethoxypentanonitrile, heptanonitrile, decanonitrile, octadecanonitrile, triacontanonitrile, acrylonitrile, methacrylonitrile, cyanocyclopropane, cyanocyclobutane, phenylacetonitrile, phenylhexanonitrile, benzonitrile, p-nitrobenzonitrile, toluonitrile, alpha-naphthonitrile, cinnamonitrile, citronitrile, adiponitrile, oxalonitrile, malononitrile, succinonitrile, suberonitrile, alpha-methylene glutaronitrile, maleonitrile, 1,3-dicyanocyclohexane, 1,2-dicyanocyclobutane, tricarballylonitrile, 1,3-dicyano-5-ethylbenzene, phthalonitrile, isophthalonitrile, terephthalonitrile, etc. According to a preferred embodiment of the invention, the nitrile is an aromatic nitrile, especially an aromatic dinitrile such as terephthalonitrile or other phthalonitrile.

The carboxylic acid employed as a solvent may be any one or more aliphatic or aromatic carboxylic acids such as acetic, propionic, butyric, octanoic, decanoic, glycolic, fumaric, oleic, lactic, naphthenoic, carboxycyclobutane, carboxycyclodecane, benzoic, toluic, naphthoic, etc. Preferably it is a water-soluble acid such as an alkanoic acid containing 2–10 carbon atoms. Acetic acid is especially preferred. The acid is normally employed in an amount such as to provide an acid/nitrile molar ratio of about 5–50, preferably 10–30.

The water required for the hydrolysis may be added per se or may be derived from the carboxylic acid by dehydration to the anhydride under the reaction conditions. In either case, the amount of water is usually in the range of about 1–50, preferably 5–15, molar proportions per molar proportion of the nitrile.

The catalyst may be one or more organic or inorganic cupric, nickelous, or mercuric salts, e.g., a nitrate, chloride, bromide, iodide, sulfate, formate, acetate, propionate, octanoate, decanoate, oleate, lactate, benzoate, naphthenoate, toluate, naphthoate, etc., of any of these divalent metals. The salts of alkanoic acid containing 2–10 carbon atoms are preferred, and it is ordinarily preferred to employ a salt, the anion of which is the conjugate base of the acid being used as a solvent. Since difficultly removable metallic mercury may be formed when mercuric salts are employed, the cupric and nickelous salts are preferred over the mercuric salts. Particularly good results are obtained when the catalyst is cupric acetate or nickelous acetate. The catalyst is usually employed in an amount such as to provide a salt/nitrile molar ratio of about 0.02–1, preferably 0.1–0.2.

The hydrolysis is ordinarily conducted at reflux temperatures, although higher or lower temperatures may be employed if desired; and the reaction time depends on the temperature employed. Usually the reaction time is in the range of about 1–36 hours, preferably about 2–24 hours. A reaction time of about 3–6 hours is frequently adequate. Although the product is generally of high purity, it may be washed with water and dilute ammonium hydroxide, if desired to remove traces of metal catalyst.

Except with reference to particular products, the term "amide" is usually used in the specification and claims to include imides as well as the compounds normally designated as amides. Imides or mixtures of imides and amides are formed when the nitrile contains two cyano groups on adjacent carbon atoms, as in phthalonitrile.

The following examples are given to illustrate the invention and are not intended as a limitation thereof.

CONTROL A

Purge a suitable reaction vessel with nitrogen and charge it with one molar proportion of terephthalonitrile, 10 molar proportions of water, and 20 molar proportions of glacial acetic acid. Heat to reflux temperature and continue refluxing for four hours. No ammonia is evolved, and no solid is present at the end of the reaction. Cool the reaction mixture to precipitate white crystals and wash the precipitate. Infra-red analysis of the product shows it to be the starting material, i.e., terephthalonitrile.

CONTROL B

Repeat Control A except for charging the water in the form of a hydrochloric acid solution providing 3 molar proportions of hydrogen chloride and 10 molar proportions of water. The solid obtained after cooling and washing is 97% pure terephthalonitrile, as determined by infra-red analysis.

CONTROL C

Conduct five reactions by repeating Control A except for also charging:

(1) 0.16 molar porportion of cadmium acetate,
(2) about 0.22 molar proportion of zinc acetate dihydrate,
(3) about 0.29 molar proportion of manganous acetate tetrahydrate,
(4) 0.13 molar proportion of silver acetate, and
(5) about 0.59 molar proportion of magnesium acetate to the respective reaction vessel. In each reaction, the product is primarily terephthalonitrile with a trace amount of terephthalamide, as determined by infra-red analysis.

EXAMPLE I

Repeat Control A except for also charging 0.1 molar proportion of cupric acetate as a catalyst. After about one hour of refluxing, a white solid begins to precipitate. Continue refluxing for a total of four hours, cool the reaction mixture, and wash and dry the precipitate. The reaction results in a 91% yield of terephthalamide, as determined by infra-red analysis.

EXAMPLE II

Repeat Example I except for employing only 0.05 molar proportion of cupric acetate. The yield of terephthalamide is 82.5%.

EXAMPLE III

Repeat Example I except for substituting about 0.03 molar proportion of nickelous acetate for the cupric acetate. The yield of terephthalamide is 44.5% of the theoretical yield.

EXAMPLE IV

Repeat Example III except for substituting 20 molar proportions of propionic acid for the acetic acid. The yield of terephthalamide is 86.5%.

EXAMPLE V

Repeat Example I except for substituting one molar proportion of isophthalonitrile for the terephthalonitrile. The reaction results in a 78.6% yield of isophthalamide.

EXAMPLE VI

Repeat Example I except for substituting one molar proportion of phthalonitrile for the terephthalonitrile. The product is a mixture of 75-85% phthalamide and 25-15% phthalimide.

EXAMPLE VII

Repeat Example I except for substituting one molar proportion of benzonitrile for the terephthalonitrile and about 0.11 molar proportion of mercuric acetate for the cupric acetate. The reaction results in almost a 100% yield of benzamide.

EXAMPLE VIII

Repeat Example VII except for substituting one molar proportion of p-nitrobenzonitrile for the benzonitrile and using only 0.1 molar proportion of the mercuric acetate. The yield of p-nitrobenzamide is 82.5%.

EXAMPLE IX

Repeat Example VIII except for substituting one molar proportion of p-toluonitrile for the p-nitrobenzonitrile. The yield of p-toluamide is 89%.

EXAMPLE X

Repeat Example VIII except for substituting one molar proportion of chloracetonitrile for the p-nitrobenzonitrile. The yield of chloracetamide is 55.5%.

EXAMPLE XI

Repeat Example VIII except for substituting one molar proportion of adiponitrile for the p-nitrobenzonitrile and refluxing for 24 hours. The yield of a adipamide is 80.5%.

It is obvious that many variations may be made in the products and processes set forth above without departing from the spirit and scope of this invention.

What is claimed is:

1. A process which comprises refluxing one molar proportion of an aliphatic or aromatic hydrocarbyl nitrile or a halo, nitro, alkoxy, hydroxy, oxo, or thio derivative thereof and about 1–50 molar proportions of water in the presence of about 5–50 molar proportions of an alkanoic acid containing 2–10 carbon atoms and about 0.02–1 molar proportion of a cupric, nickelous, or mercuric salt for about 1–36 hours.

2. The process of claim 1 wherein the nitrile is an aromatic nitrile.

3. The process of claim 2 wherein the aromatic nitrile is a phthalonitrile.

4. The process of claim 3 wherein the phthalonitrile is terephthalonitrile.

5. The process of claim 1 wherein the alkanoic acid is acetic acid.

6. The process of claim 1 wherein the salt is an alkanoate containing 2–10 carbon atoms.

7. The process of claim 7 wherein the salt is cupric acetate.

8. The process of claim 6 wherein the salt is nickelous acetate.

References Cited

UNITED STATES PATENTS 3,381,034  4/1968  Greene et al. ........ 260—558
3,670,021  6/1972  Goetz et al. ........ 260—558

HARRY I. MOATZ, Assistant Examiner

U.S. Cl. X.R.

260—557 R, 558 D, 558 S, 559 R, 561 K, 561 S, 561 HL, 561 B, 561 A, 561 N